(12) United States Patent
Faurie

(10) Patent No.: US 9,628,171 B2
(45) Date of Patent: Apr. 18, 2017

(54) SYSTEMS AND METHODS FOR TIMESLOT ASSIGNMENT IN A WIRELESS NETWORK

(71) Applicant: BlackBerry Limited

(72) Inventor: Rene Faurie, Versailles (FR)

(73) Assignee: BlackBerry Limited, Waterloo, Ontario (CA)

( * ) Notice: Subject to any disclaimer, the term of this patent is extended or adjusted under 35 U.S.C. 154(b) by 193 days.

(21) Appl. No.: 13/840,270

(22) Filed: Mar. 15, 2013

(65) Prior Publication Data

US 2014/0269450 A1 Sep. 18, 2014

(51) Int. Cl.
*H04J 3/00* (2006.01)
*H04B 7/26* (2006.01)
*H04W 56/00* (2009.01)

(52) U.S. Cl.
CPC ...... *H04B 7/2656* (2013.01); *H04W 56/0005* (2013.01); *H04W 56/0045* (2013.01)

(58) Field of Classification Search
None
See application file for complete search history.

(56) References Cited

U.S. PATENT DOCUMENTS

| | | | | |
|---|---|---|---|---|
| 2004/0151143 | A1* | 8/2004 | Abdesselem et al. | 370/336 |
| 2005/0002374 | A1* | 1/2005 | Beard et al. | 370/347 |
| 2012/0213153 | A1* | 8/2012 | Faurie et al. | 370/328 |
| 2013/0051374 | A1* | 2/2013 | Faurie | 370/337 |

FOREIGN PATENT DOCUMENTS

EP 2563063 A1 2/2013

OTHER PUBLICATIONS

TELEFON AB LM Ericsson et al: "Clarification of Shifted USF in Combination with EFTA," 3GPP TSG-GERAN Meeting #49; GP-110454; Chengdu, China; Mar. 3, 2011 (4 pages).
Research in Motion UK Ltd: "On Multislot Capability Parameters Applicable to EFTA 1," 3GPP TSG-GERAN Meeting #51; GP-111274; Gothenburg, Sweden; Aug. 28, 2011 (6 pages).
TELEFON AB LM Ericsson et al: "Summary on EFTA," 3GPP TSG-GERAN Meeting #42; GP-090681; Shenzhen, China; May 5, 2009 (5 pages).
European Patent Office Communication for EP Application No. 13159630.6, dated Aug. 1, 2013, (10 pages).
European Patent Office Communication for EP Application No. 13159631.4, dated Aug. 1, 2013, (10 pages).
3GPP TS 44.060: "Radio Link Control (RLC) and Medium Access Control (MAC) Protocol," Mar. 2012.
3GPP TS 45.002: "Multiplexing and Multiple Access on the Radio Path," Dec. 2012.
3GPP TS 24.008: "Mobile Radio Interface Layer 3 Specification; Core Network Protocols; Stage 3," Sep. 2011.
GP-011755: "High Multislot Classes for Type 1 Mobiles," Motorola, Aug. 2001.

* cited by examiner

*Primary Examiner* — Kibrom T Hailu
(74) *Attorney, Agent, or Firm* — Fish & Richardson P.C.

(57) ABSTRACT

A mobile station in a communications system includes hardware and software stored on a tangible computer readable medium that, during operation, cause the mobile station to receive a timeslot assignment from a wireless network and operate based on the received timeslot assignment. The timeslot assignment may be based on whether a timing advance offset is used by the wireless network. The mobile station may also receive an indication from the wireless network, indicating whether a timing advance offset is used by the wireless network. The mobile station may subsequently operate based on the received indication.

21 Claims, 9 Drawing Sheets

SYSTEMS AND METHODS FOR TIMESLOT ASSIGNMENT IN A WIRELESS NETWORK

TECHNICAL FIELD

The present disclosure generally relates to wireless communications, and more particularly, to systems and methods for timeslot assignment in wireless communication networks.

BACKGROUND

The Global System for Mobile (GSM) communication system used in wireless communications employs a time-division multiple access (TDMA) scheme. Such a system allows multiple users to share a same frequency channel by dividing the channel into different timeslots. Each timeslot, also referred to as a "slot" in the present disclosure, provides an available transmission time for a mobile station in the system. Thus, the mobile stations transmit to and receive from a network in succession within their assigned timeslots.

For GSM, each radio frequency channel is divided according to a time division multiple access scheme into eight timeslots collectively referred to as a frame or a TDMA frame. These timeslots and frames repeat in time and provide a framework for communications in both the uplink (from a mobile station or user equipment to a base station or network) and the downlink (from the base station or network to the mobile station or user equipment).

In a GSM/EDGE radio access network (GERAN), a mobile station multislot class defines the maximum number of timeslots the mobile station can support for transmission and reception within any given TDMA frame. A mobile station may signal different multislot classes to the wireless network, depending on the features supported, e.g. General Packet Radio Service (GPRS), Enhanced General Packet Radio Service (EGPRS), Dual Transfer Mode (DTM).

DETAILED DESCRIPTION

Reference will now be made in detail to exemplary embodiments, examples of which are illustrated in the accompanying drawings. Wherever possible, the same reference numbers will be used throughout the drawings to refer to the same or like parts.

Figure 1:
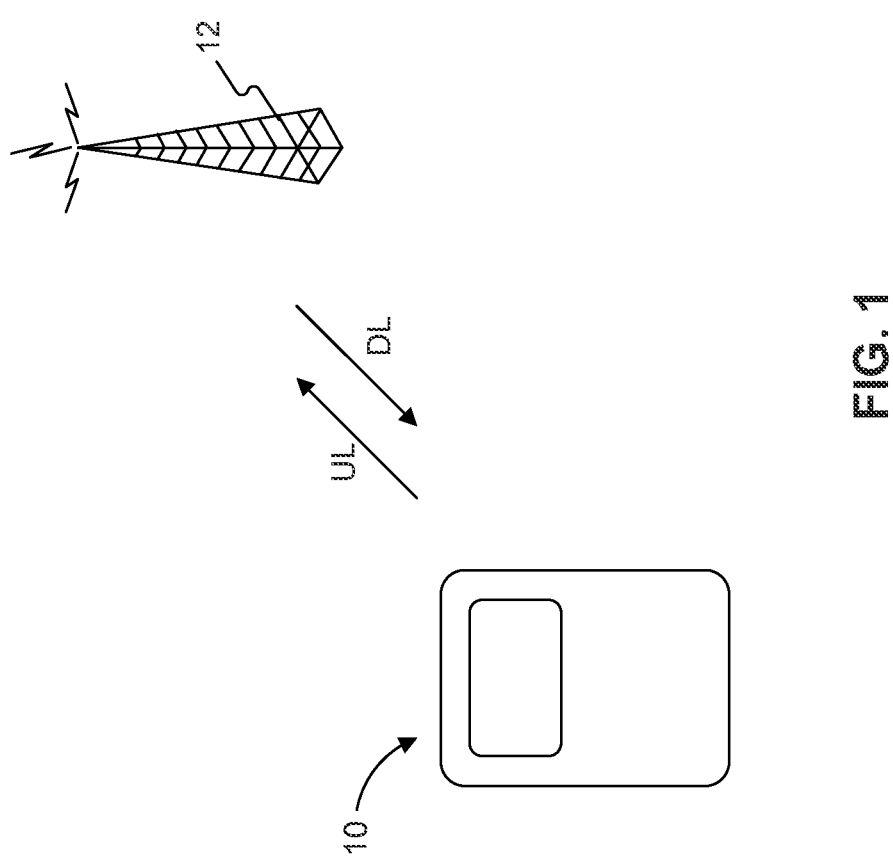
FIG. 1 is a block diagram illustrating a wireless communication system for implementing embodiments of the present disclosure.

FIG. 1 is a block diagram illustrating a wireless communication system. A mobile station 10 (e.g., MS) is shown communicating with a wireless base station 12. The mobile station 10 is able to exchange data and information with the base station 12 via uplink (UL) and downlink (DL) timeslots.

Figure 2:
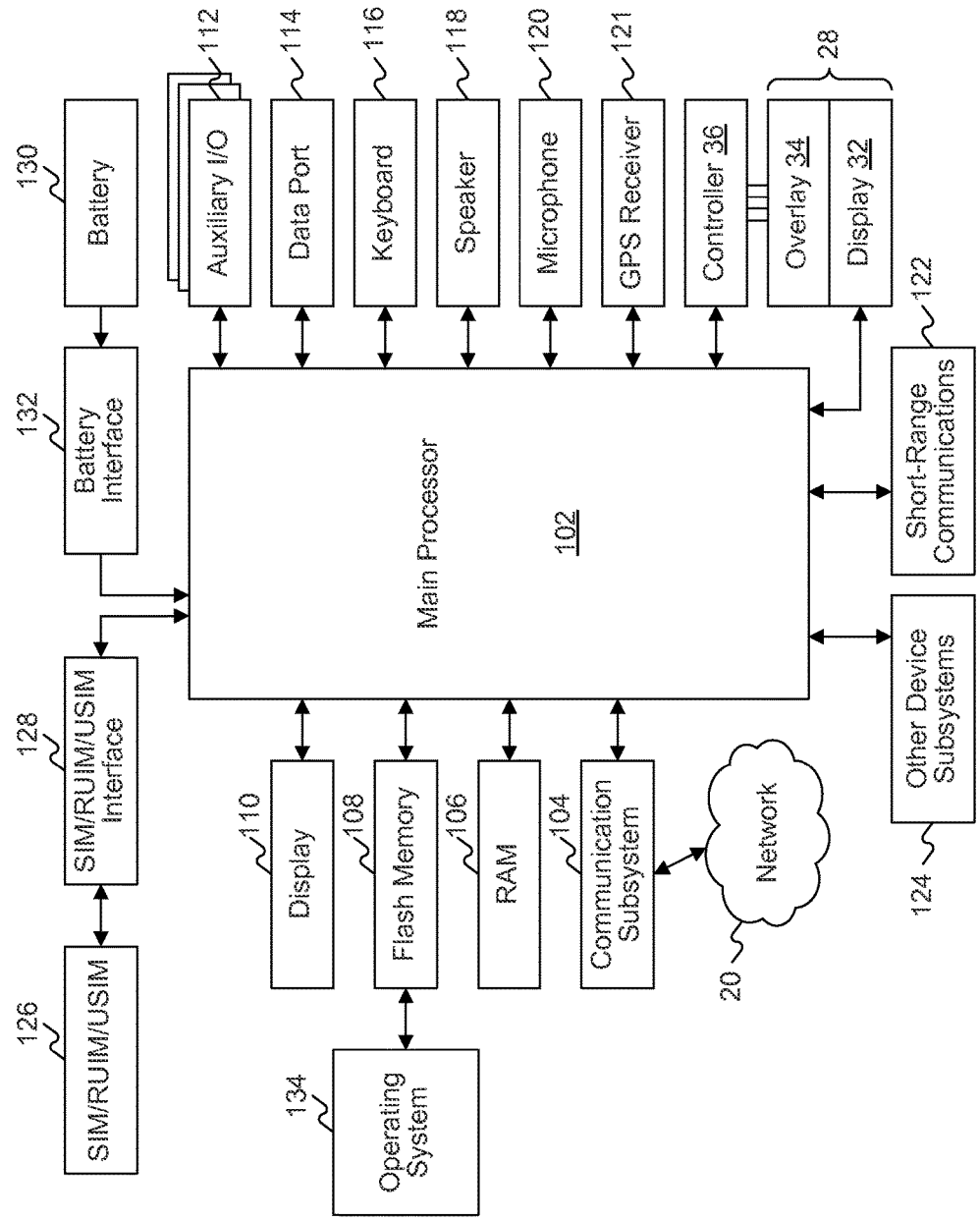
FIG. 2 is a block diagram illustrating an exemplary embodiment of a mobile station.

FIG. 2 illustrates an exemplary configuration for the mobile station 10. Referring first to FIG. 2, shown therein is a block diagram of an exemplary embodiment of a mobile station 10. The mobile station 10 comprises a number of components such as a main processor 102 that controls the overall operation of the mobile station 10. Communication functions, including data and voice communications, are performed through a communication subsystem 104. The communication subsystem 104 receives data from and sends data to a wireless network 20. In this exemplary embodiment of the mobile station 10, the communication subsystem 104 is configured in accordance with the GSM and GPRS standards, which are used worldwide. Other communication configurations that are equally applicable are, for example, Evolved EDGE or EDGE Evolution. The wireless link connecting the communication subsystem 104 with the wireless network 20 represents one or more different Radio Frequency (RF) channels.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124. As will be discussed below, the short-range communications 122 can implement any suitable or desirable device-to-device or peer-to-peer communications protocol capable of communicating at a relatively short range, e.g. directly from one device to another. Examples include Bluetooth®, ad-hoc WiFi, infrared, or any "long-range" protocol re-configured to utilize available short-range components. It will therefore be appreciated that short-range communications 122 may represent any hardware, software or combination of both that enable a communication protocol to be implemented between devices or entities in a short range scenario, such protocol being standard or proprietary.

Some of the subsystems of the mobile station 10 perform communication-related functions, whereas other subsystems may provide "resident" or on-device functions. By way of example, the display 110 and the keyboard 116 may be used for both communication-related functions, such as entering a text message for transmission over the network 20, and device resident functions such as a calculator or task list.

The mobile station 10 can send and receive communication signals over the wireless network 20 after required network registration or activation procedures have been completed. Network access is associated with a subscriber or user of the mobile station 10. To identify a subscriber, the mobile station 10 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile station 10 is not fully operational for communication with the wireless network 20. Once the SIM/RUIM/USIM 126 is inserted into the SIM/RUIM/USIM interface 128, it is coupled to the main processor 102.

The mobile station 10 is typically a battery-powered device and in this example includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile station 10. Although current technology makes use of a battery, future technologies such as micro fuel cells may provide the power to the mobile station 10.

The mobile station 10 also includes an operating system 134 including software components. The operating system 134 and its software components are executed by the main processor 102 are typically stored in a persistent store such as the flash memory 108, which may alternatively be a read-only memory (ROM) or similar storage element. Those skilled in the art will appreciate that portions of the operating system 134 and its software components may be temporarily loaded into a volatile store such as the RAM 106.

Although FIG. 2 illustrates an exemplary configuration for the mobile station 10, in alternative implementations, those skilled in the art will appreciate that the components of mobile station 10 may be capable of performing functions associated with other components of mobile station 10.

Figure 3:
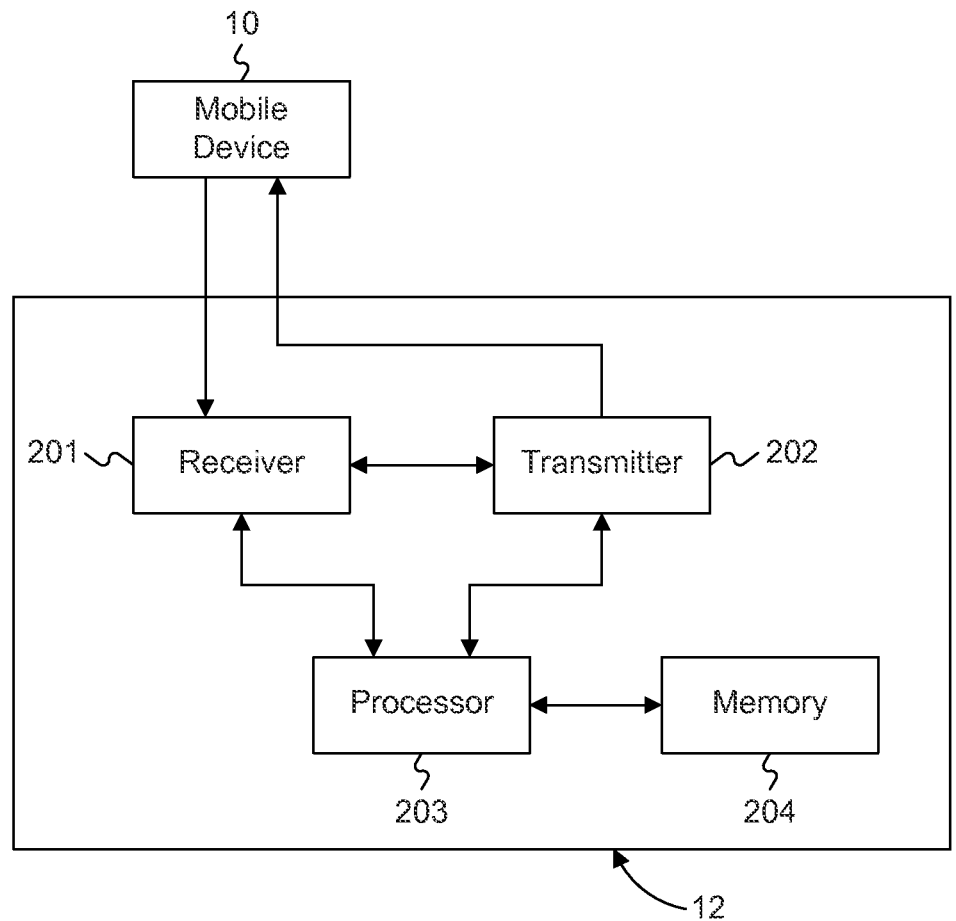
FIG. 3 is a block diagram illustrating a base station in communication with a mobile station.

FIG. 3 is a block diagram illustrating a base station 12. In order to communicate with mobile station 10, base station 12 includes a receiver 201 and transmitter 202 connected to a processor 203. The processor 203 is configured to perform various functions including obtaining multislot classes of mobile stations, determining downlink multislot configurations, assigning or allocating uplink timeslots, etc. The processor 203 is also configured to perform other functions such as device control, input/output, and other data processing related functions. It is noted that the processor 203 may be located outside of the base station 12 in a separate entity on the network 20. Base station 12 may include memory device 204 in communication with the processor 203. Memory device 204 may be random-access memory (RAM), dynamic random-access memory (DRAM), or similar storage element.

Although FIG. 3 illustrates an exemplary configuration for the base station 12, in alternative implementations, those skilled in the art will appreciate that the components of base station 12 may be capable of performing functions associated with other components of base station 12.

The examples and embodiments provided below describe various methods and systems for providing enhanced support of high multislot classes mobile stations, such as the support of advanced timeslot assignments or of advanced multislot configurations, and, in some embodiments, for the operation of a network or mobile station in accordance with such enhancements, such as mobile station 10 used in a TDMA communication network such as GSM. As known to those of ordinary skill in the art, the multislot capability of a mobile station defines the maximum number of timeslots (up to 8 timeslots in each of downlink and uplink) of a TDMA frame that a mobile station is able to use for monitoring/receiving in downlink (Rx) or transmitting in uplink (Tx). The multislot capability also defines the maximum sum (SUM) of the transmit and receive timeslots that a mobile station can use within a given TDMA frame, hence within a given radio block period. In the present disclosure, a downlink timeslot may be referred to as a receive timeslot, and an uplink timeslot may be referred to as a transmit timeslot, i.e. receive and transmit operations are considered from a mobile station perspective. The multislot capability also defines the minimum time required for the mobile to get ready to receive (Tra or Trb), and to get ready to transmit (Tta or Ttb), including the case where some adjacent or neighbor cell power measurements may need to be carried out within one (at most) of the two switching times (in which case either Tra or Tta is applicable, otherwise Trb or Ttb is applicable instead). In the present disclosure, multislot configurations used in duplex mode (i.e. the mobile station is both transmitting in uplink and monitoring/receiving in downlink during a TDMA frame or a radio block period) may be based on a Tra/Ttb (or Tta/Trb) switching times combination when the mobile station performs the cell power measurements between transmission and reception/monitoring (or between reception/monitoring and transmission). This corresponds to multislot configurations for which "Tra shall apply" (respectively "Tta shall apply") is set to "Yes" in 3rd Generation Partnership Project (3GPP) Technical Specification (TS) 45.002 Table 6.4.2.2.1.

Examples of how a mobile station may operate in accordance with these capabilities, which are also referred to as parameters in the present disclosure, include the following: i) the mobile station may reject or ignore an assignment of resources that do not comply with the parameters or may, in response, perform appropriate subsequent actions such as retransmitting a request for resources; ii) it may schedule transmissions of uplink bursts (including those corresponding to poll responses) or the reception of downlink bursts in accordance with the parameters e.g. by ensuring that the gap between transmission and subsequent reception (or vice versa) is in accordance with the applicable switching times, which may allow for measurement of an aspect of a (non-serving) cell; in particular, it may omit to transmit or receive bursts on timeslots which have been allocated to it (in the uplink case, whether by means of an uplink state flag (USF) or a poll) or (in the downlink case) may have been allocated to it i.e. may be used for transmissions addressed to the mobile station; iii) it may set or configure other parameters (such as radio link control window size or radio link control buffer size) according to its parameters, or iv) it may utilize features, capabilities or techniques (for example, shifted USF, the use of certain modulation schemes or the use of features that are applicable to or supported by mobile stations based on their respective parameters) appropriate to the determined parameters.

Similarly, the network may operate in accordance with the parameters determined in respect of a particular mobile station by i) ensuring that timeslot assignments or allocations comply with the determined parameters; ii) by requiring or utilizing features, capabilities or techniques (for example, shifted USF, the use of certain modulation schemes or the use of features that are applicable to or supported by mobile stations based on their respective parameters) appropriate to the determined parameters; or iii) by determining the mobile station's schedule for data reception based on observation of its transmissions. Note that details of how the network or mobile station operates in accordance with the determined parameters may vary according to various factors, such as the medium access control protocol applicable or the capabilities or features of the mobile station or network that are being used (for example, whether the flexible timeslot assignment technique is applicable to an assignment) and further specific examples may be described below in one or more of the described embodiments. In particular, in some embodiments, the mobile station takes account of requirements to transmit in a given radio block period uplink data or control messages to determine on which, if any, allocated timeslots it transmits.

One feature closely related to mobile station switching capabilities is the timing advance (TA) offset. By this mechanism, the base station offsets (advances) its receive (i.e. corresponding to uplink) timebase relative to its transmit (i.e. the downlink) timebase, which results in a minimum timing advance value (the offset specified for a GSM/EDGE radio access network is of 31 symbol periods—see 3GPP TS 45.002 Annex B.1) for the mobile station. This, in particular, enables a mobile station supporting this capability to switch between transmit and receive operations in less time than would otherwise be the case. Mobile stations which can take advantage of such a mechanism may support switching times such as Trb=to or Tra=1+to ('1' standing for one timeslot duration), where 'to' represents the value of timing shift used in the TA offset mechanism, compared to e.g. Trb=1 timeslot or Tra=2 timeslots.

The parameters described above (switching times, SUM, Rx, Tx, etc.) are typically communicated to the network in the form of a multislot class parameter. As such, a single multislot class parameter may permit the network to determine the various parameters applicable to the mobile station and hence (or otherwise directly) take into account the capabilities and applicable parameters in subsequent assignments, allocations, etc. Generally, multislot classes specified for full duplex operation (i.e. where the mobile station both transmits and receives during a given TDMA frame), in particular classes 30-45, indicate self-consistent parameters, in particular, such that SUM+one of (Tra+Ttb) and (Tta+Trb) switching times combinations is no greater than 8 timeslots. Note that the values taken from 3GPP TS 45.002 Table B.1 may result in a total sum higher than 8 timeslots, as the indicated switching times may not take a timing advance shift into account. A mobile station may indicate various multislot classes, applicable respectively to different capabilities or configurations, e.g. one multislot class for Enhanced General Packet Radio Service (EGPRS) configurations, and a different one for dual transfer mode (DTM) operation in EGPRS mode. Any of such multislot classes may be generally referred to as a "conventional multislot class" or simply as a "multislot class" in the present disclosure. Currently, as described below, parameters applicable to enhanced flexible timeslot assignment (EFTA) operation may be determined based on one or both of a conventional multislot class and an alternative multislot class. Signaling of the multislot class(es) to the network is typically by means of the MS (Mobile Station) Radio Access Capability information element (see 3GPP TS 24.008) transmitted by the mobile station to a network entity. A radio access network entity (such as processor 203) may receive them indirectly, from a core network entity or directly from the mobile station.

The indication of a particular multislot class (corresponding to a set of parameters) may imply support for a particular feature or capability, such as one that may be required to benefit from low switching times and/or support for high numbers of receive and/or transmit timeslots. Further indications may indicate a replacement or adjustment to one or more parameters derived from a multislot class, such as a reduction in the number of receive timeslots when a particular feature, e.g. downlink dual carrier, is being used.

As also known to those of ordinary skill in the art, timeslots within a TDMA system may be assigned and allocated. In this context, assignment refers to the set of timeslots that are made available (by means of signaling such as by an assignment message) to a given mobile station. Allocation refers to the set of timeslots selected dynamically (e.g. on a radio block-by-radio block basis) for the use of a particular mobile station. Multiple mobile stations can share the same or overlapping assignments, and allocation can be used to avoid collisions.

Since it is generally desirable to be able to allocate timeslots over multiple frames, assignments are typically valid over multiple TDMA frames. Such an arrangement is referred to as temporary block flow (TBF). A TBF is unidirectional. An uplink TBF relates to uplink assignment/allocation, and a downlink TBF relates to downlink assignment/allocation. The timeslot numbering for the uplink is offset from the timeslot numbering for the downlink such that a mobile station can receive on a downlink timeslot and transmit on the uplink timeslot with the same number in the same TDMA frame without requiring the mobile station to receive and transmit at the same time.

For downlink allocation, after assignment, the network transmits using some or all of the assigned timeslots. Each mobile station that receives signals from the network on the downlink timeslots assigned to it can determine whether there is any content addressed to itself, meaning that those particular timeslots were allocated to the mobile station. All, a subset, or none of the timeslots assigned to a mobile station may be allocated to the mobile station in a given frame.

For uplink allocation, a mechanism is employed based on an uplink state flag (USF) for allocating uplink radio blocks to different mobile stations sharing the same uplink Packet Data Channel(s) (PDCH(s)).

The techniques and embodiments of the present disclosure are generally described for a Basic Transmission Time Interval (BTTI) configuration, i.e. a configuration in which a radio block is transmitted using one packet data channel (PDCH) in each of four consecutive TDMA frames (i.e., within a duration of about 20 ms). However, those skilled in the art will appreciate that similar techniques and embodiments would similarly apply to a Reduced Transmission Time Interval (RTTI) configuration, i.e. a configuration in which a radio block is transmitted using a pair of PDCHs in each of two consecutive TDMA frames (i.e., within a duration of about 10 ms), or to other time interval patterns. Likewise, the techniques and embodiments in the present disclosure are generally described for a single carrier configuration (a single radio frequency channel is used), while they would similarly apply for a downlink dual carrier configuration, for a downlink multi carrier configuration or for any other configuration involving multiple downlink and/or uplink carriers/radio frequency channels.

In the present disclosure, a multislot configuration generally consists in a number 'd' of contiguous downlink timeslots and a number 'u' of contiguous uplink timeslots in a TDMA frame, resulting from an assignment by the wireless networks. In reference to the GSM/CPRS standard, if the downlink (respectively uplink) timeslots assigned to the mobile station are not contiguous, 'd' (respectively 'u'), and by extension the multislot configuration, also include the number of downlink (respectively uplink) timeslots not assigned to the mobile station that are located between assigned downlink (respectively uplink) timeslots. In the present disclosure, "multislot configuration" may be referred to as "timeslot assignment" with the same meaning.

In case multiple downlink and/or uplink carriers are involved, all the downlink timeslots on multiple radio frequency channels are assigned within a window of size 'd' and all the uplink timeslots on multiple radio frequency channels are assigned within a window of size 'u' where 'd' and 'u' characterize the multislot configuration.

A first example of uplink allocation that can be employed is referred to as dynamic allocation (DA), which is a medium access control (MAC) medium access mode. Using DA, to allocate an uplink radio block, a USF contained in a radio block transmitted by the network in a downlink timeslot in a given radio block period is used to allocate a radio block using the corresponding uplink timeslot in the next radio block period, or in the next four radio block periods depending on the value of a USF granularity parameter (e.g. "USF_GRANULARITY") signaled by the network to the mobile station. With conventional DA, the corresponding uplink timeslot has the same number as the downlink timeslot in which the downlink radio block containing the USF is received.

Extended dynamic allocation (EDA) is another MAC medium access mode. With EDA, for an uplink TBF, a USF contained in a downlink radio block transmitted by the network in a given downlink timeslot means that the uplink timeslot having the same number as the given downlink timeslot and all assigned uplink timeslots with higher timeslot numbers than that timeslot are being allocated for block transmission in the next radio block period, or in the next four radio block periods depending on the value of a USF granularity parameter. In some embodiments, a variant of conventional EDA may be employed in which the corresponding uplink timeslot can be an uplink timeslot having an uplink timeslot number that is the same or different from the downlink timeslot number of the timeslot in which the downlink radio block containing the USF is received. Such variant may use the shifted USF technique, for example. With shifted USF, the USF for the first assigned uplink PDCH is sent on the downlink PDCH corresponding to (i.e. with the same timeslot number as) the second assigned uplink PDCH.

Without any type of flexible timeslot assignment (FTA) technique, the total number of downlink and uplink timeslots assigned by a base station to a mobile station shall not exceed the value defined by the SUM parameter of the mobile station for the considered multislot class. For example, for a class 33 mobile station (Rx=5; Tx=4; SUM=6), an assignment which defines the number of timeslots in downlink and uplink being 4 (d) and 2 (u) respectively is acceptable. In this scenario, Rx is the maximum number of receive timeslots the mobile station can use per TDMA frame, Tx is the maximum number of transmit timeslots the mobile station can use per TDMA frame, and SUM is the maximum total number of uplink (u) and downlink (d) timeslots that can be used by the mobile station per TDMA frame.

With the FTA technique, as defined in 3GPP GERAN specifications, the total number of downlink and uplink assigned timeslots may exceed the value defined by the SUM parameter of the considered mobile station multislot class. A change in the uplink/downlink bandwidth ratio can therefore be achieved more easily by the network in just varying the allocation (uplink and downlink) within the assignment without changing the assignment. The network must ensure that the total number of downlink and uplink allocated timeslots within the TDMA frame shall not exceed the value defined by the SUM parameter of the considered mobile station multislot class.

With the enhanced flexible timeslot assignment (EFTA) technique, as defined in 3GPP GERAN specifications, the total number of downlink and uplink assigned timeslots and the total number of downlink and uplink allocated timeslots may exceed the value defined by the SUM parameter of the considered mobile station multislot class. One EFTA rule states that uplink transmissions are prioritized by the mobile station over the reception of downlink transmission. Thus, a mobile station that has data to transmit uses some or all allocated uplink timeslots and monitors as many of its assigned downlink timeslots as possible. This EFTA feature allows a mobile station to receive downlink data on downlink timeslots that it would not have been able to receive had it been transmitting.

In other words, compared to non-EFTA cases, where the mobile station may be allocated uplink resources that it has no need for, in which case the mobile station cannot receive any downlink data due to the requirement that the total number of downlink and uplink allocated timeslots shall not exceed the value defined by the SUM parameter of the considered mobile station multislot class, an EFTA-enabled mobile station may monitor the downlink, and hence potentially receive downlink data, when no uplink block has to be transmitted, regardless of the uplink allocation. This EFTA feature is applicable only to mobile stations which belong to high multislot classes 30-45.

Embodiment 1

Support of Non-FTA Multislot Configurations with 5 Uplink Slots for Multislot Classes 44-45 when TA Offset is not Used In the GERAN system, multislot configurations with 5 uplink timeslots are supported by high multislot classes 34, 39 and 44-45. Relevant excerpts of 3GPP 45.002, Table 6.4.2.2.1 are reproduced in Table 1 below.

TABLE 1

Multislot configurations for packet switched connections, from 3GPP TS 45.002 v11.0.0, Table 6.4.2.2.1

| Medium access mode | No of Slots (Note 0) | $T_{ra}$ shall apply | $T_{ta}$ shall apply | Applicable Multislot classes (see Note 7) | Note |
|---|---|---|---|---|---|
| Uplink, Ext. Dynamic | ... | | | | |
| | u = 4 | Yes | — | 33-34, 38-39, 43-45 (a) | 2 |
| | u = 5 | Yes | — | 34 (b1), 39 (b2) | 2, 3, 5 |
| | u = 5 | — | Yes | 44-45 (c) | 2, 4 |
| | ... | | | | |
| Down + up, Ext. Dynamic | ... | | | | |
| | d = 1, u = 4 | Yes | — | 33-34, 38-39, 43-45 (a) | 2, 6 |
| | d = 1, u = 5 | Yes | — | 34 (b1), 39 (b2) | 2, 3, 5 |
| | ... | | | | |
| | d = 1, u = 5 | — | Yes | 44-45 (c) | 2, 4 |
| | ... | | | | |

...
Note 3
TA offset required for multislot classes 35-39.
Note 4
TA offset required for multislot classes 40-45.
Note 5
Shifted USF operation shall apply (see 3GPP TS 44.060).
...

It can be seen from Table 1 that the multislot configurations specify a number of downlink timeslots (i.e., "d") and uplink timeslots (i.e., "u"). The support of the d=1, u=5 and u=5 configurations for multislot classes 44-45 necessitates that a timing advance offset is used by the network. However, when no timing advance offset is used by a network, the requirement to fulfill Ttb=to (switching time between reception and transmission) and Tra=1 (switching and measurements time between transmission and reception) would not allow the mobile station to use the 5 uplink timeslots for transmission according to extended dynamic allocation principles. Consequently, mobile stations of multislot classes 44 or 45 in a network in which timing advance offset is not used would be assigned a configuration comprising at most u=4 uplink timeslots for providing the required time for switching and cell measurements.

In accordance with this embodiment, the application of shifted USF may be required or the application of shifted USF may be allowed for multislot configurations with u=5 uplink slots. These configurations would be valid in a network not using timing advance offset. Due to faster switching capability of multislot classes 44-45, either Tra=1 or Tta=1 could be used for cell measurements.

Figure 4:
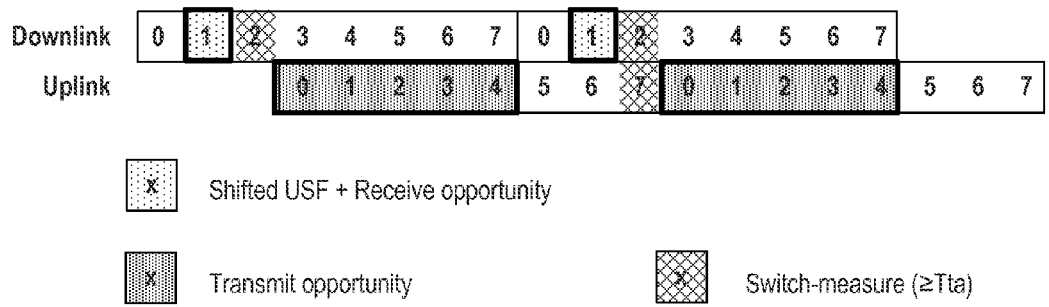
FIG. 4 is a timing diagram of a multislot configuration for multislot classes 44-45 with shifted Uplink State Flag (USF), applicable if TA offset is not used.

FIG. 4 illustrates a timing diagram of a multislot configuration for multislot classes 44-45 with shifted USF, with the use of Tta. Note that FIG. 4 only shows one multislot configuration while there exist other multislot configurations with same properties by shifting the timeslots left or right within the TDMA frame.

Embodiment 2

Full Support of Multislot Configurations with 4 Uplink Slots for Multislot Classes 38-39

In the GERAN system, the "u=4" (Uplink, EDA) and "d=1, u=4" (Downlink+Uplink, EDA) multislot configurations with 4 uplink timeslots are supported by multislot classes 12, 33-34, 38-39 and 43-45. Relevant excerpts of 3GPP 45.002, Table 6.4.2.2.1 are reproduced in Table 2 below.

TABLE 2

Multislot configurations for packet switched connections, from 3GPP TS 45.002 v11.0.0, Table 6.4.2.2.1

| Medium access mode | No of Slots (Note 0) | $T_{ra}$ shall apply | $T_{ta}$ shall apply | Applicable Multislot classes (see Note 7) | Note |
|---|---|---|---|---|---|
| Uplink, Ext. Dynamic | ... | | | | |
| | u = 4 | — | Yes | 12 (a), 22-23, 27-29 | 2 |
| | u = 4 | Yes | — | 33-34 (b), 38-39 (c), 43-45 (b) | 2 |
| Down + up, Ext. Dynamic | ... | | | | |
| | d = 1, u = 4 | — | Yes | 12 (a), 22-23, 27-29 | 2 |
| | d = 1, u = 4 | Yes | — | 33-34 (b), 38-39 (c), 43-45 (b) | 2, 6 |

Note 6
The network may fallback to a lower multislot class and may not apply $T_{ra}$. A multislot class 38 or 39 MS shall in this case use $T_{ta}$ for timing advance values below 31.

The support of multislot configurations with 4 uplink timeslots for multislot classes 38-39 is not properly specified by the current standard, which may be source of inconsistent or conflicting behaviors between networks and mobile stations. First, it shall be observed from Table 2 that the "u=4" (Uplink, Ext. Dynamic) multislot configurations as specified in the current standard is invalid, as the applicability of Tra=1+to for the considered multislot classes does not allow the operation of 4 uplink timeslots according to extended dynamic allocation principles.

In addition, Table 2 specifies that the following "Note 6" requirement is applicable to the "d=1, u=4" (Down+Up, Ext. Dynamic) multislot configurations: "The network may fallback to a lower multislot class and may not apply Tra. A multislot class 38 or 39 mobile station shall in this case use Tta for timing advance values below 31." However, this description is not conclusive as to which conditions would trigger the network to fallback to a lower multislot class and not apply Tra. It is not specified either whether, for example, the mobile station assigned such a multislot configuration shall unconditionally adapt its behavior depending on the signaled timing advance value, or if it shall assume that alternative or additional conditions "may" trigger the network to fallback to Tta instead of Tra, and react according to ("in this case") such alternative or additional conditions.

A first technique that would enable the support of "u=4" (Uplink, EDA) and "d=1, u=4" (Downlink+Uplink, EDA) multislot configurations for multislot classes 38-39 is to require the applicability of Tta(=2) and Trb(=1) switching times (i.e. cell measurements would always be performed between reception and transmission at the mobile station) for these multislot configurations. This first technique does not require the use of the shifted USF mechanism.

Figure 5A:
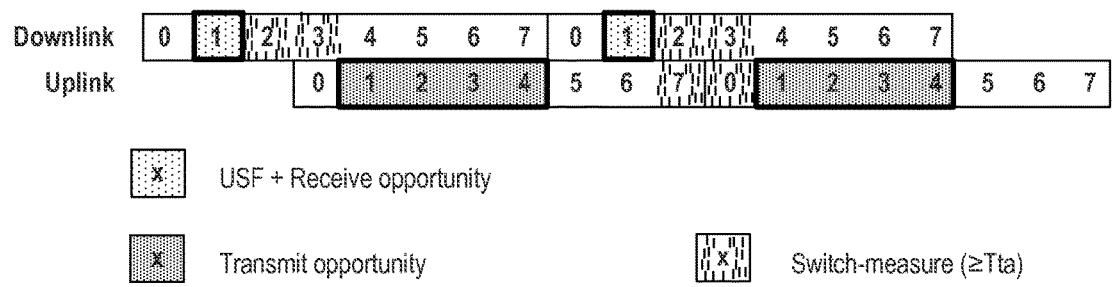
FIG. 5A is a timing diagram of a multislot configuration for multislot classes 38-39 without shifted USF, applicable if TA offset is not used.

FIG. 5A illustrates a timing diagram of a multislot configuration based on Tta/Trb for multislot classes 38-39 without shifted USF. Multislot configurations conforming to this first technique would be valid and applicable regardless of the value of the timing advance, and regardless of the use of a timing advance offset in the network.

A second technique that would enable the support of "u=4" (Uplink, EDA) and "d=1, u=4" (Downlink+Uplink, EDA) multislot configurations for multislot classes 38-39 is to require the applicability of Tra(=1+to) and Ttb(=1) switching times (i.e. cell measurements would always be performed between transmission and reception at the mobile station) in combination with the shifted USF mechanism.

Figure 5B:
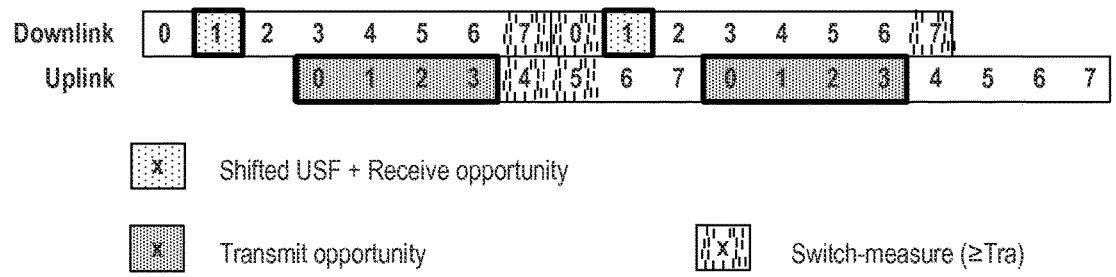
FIG. 5B is a timing diagram of a multislot configuration for multislot classes 38-39 with shifted USF, applicable if TA offset is not used.

FIG. 5B illustrates a timing diagram of a multislot configuration based on Tra/Ttb for multislot classes 38-39 with shifted USF. Multislot configurations conforming to this second technique would be valid and applicable regardless of the value of the timing advance, and regardless of the use of a timing advance offset in the network.

In some implementations, mobile stations of multislot classes 38-39 may support, or are required to support, both multislot configurations based on Tta/Trb switching times without shifted USF and multislot configurations based on Tra/Ttb switching times with shifted USF. Networks may assign either a multislot configuration without shifted USF or a multislot configuration with shifted USF depending for example on the radio resources available.

In some other implementations, the mobile station may select the switching times applicable to the considered configuration depending on the timing advance value. That is, the mobile station selects the multislot configuration based on Tra/Ttb if the timing advance is higher or equal than "to =31" normal symbol periods (which is in particular the case in a network using TA offset), but selects the multislot configuration based on Tta/Trb otherwise (timing advance lower than to =31 normal symbol periods).

Embodiment 3

New Set of FTA Multislot Configurations not Requiring TA Offset Usage

Multislot configurations requiring the support of the flexible timeslot assignment (FTA) technique (referred to as "FTA multislot configurations" in the present disclosure) are characterized by an assigned number of downlink (d) and uplink (u) slots such that d+u>SUM in the current GERAN standard. Such FTA multislot configurations (indicated by "Note 8" in 3GPP TS 45.002 Table 6.4.2.2.1) are only specified for the conditions where TA offset is used by the network for multislot classes 36-39 (as in Table 6.4.2.2.1 "Note 3: TA offset required for multislot classes 35-39") and 41-45 (as in Table 6.4.2.2.1 "Note 4: TA offset required for multislot classes 40-45"). Multislot configurations applicable to multislot classes 35 and 40, for which Rx+Tx=Sum, do not require the support of FTA (d+u≤Sum). Relevant excerpts of 3GPP 45.002, Table 6.4.2.2.1 are reproduced in Table 3 below.

TABLE 3

Multislot configurations for packet switched connections, from 3GPP TS 45.002 v11.0.0, Table 6.4.2.2.1

| Medium access mode | No of Slots (Note 0) | $T_{ra}$ shall apply | $T_{ta}$ shall apply | Applicable Multislot classes (see Note 7) | Note |
|---|---|---|---|---|---|
| ... | | | | | |
| Down + up, Ext. Dynamic | d + u = 7-9, u < 5 | Yes | — | 31-34, 36-39 | 2, 3, 8 |
| | d = 2-5, u = 5 | Yes | — | 34, 39 | 2, 3, 5, 8 |
| | ... | | | | |
| | d + u = 8-11, u < 6 | — | Yes | 41-45 | 2, 4, 8 |
| | d = 2-6, u = 6 | — | Yes | 45 | 2, 4, 5, 8 |
| ... | | | | | |

...
Note 3
TA offset required for multislot classes 35-39.
Note 4
TA offset required for multislot classes 40-45.
Note 5
Shifted USF operation shall apply (see 3GPP TS 44.060).
...
Note 8
These configurations can only be used for assignment to an MS supporting Flexible Timeslot Assignment (see 3GPP TS 24.008). For allocation additional restrictions apply.
...

Additionally, it shall be observed that a number of FTA multislot configurations specified in 3GPP TS 45.002 Table 6.4.2.2.1 and requiring the use of TA offset would be invalid if assigned by a network not using TA offset. One example of such FTA multislot configurations is a multislot configuration with d=4 downlink timeslots and u=4 uplink timeslots assigned to a mobile station of multislot class 38 or 39 (part of the "d+u=7-9, u<5" multislot configurations set in Table 6.4.2.2.1/Tra shall apply), which is only valid if TA offset is not used.

As a consequence, if TA offset is not used (e.g. because TA offset is not deployed in the network or the cell size is too large), FTA multislot configurations as specified in the current standard cannot be assigned to mobile stations of multislot classes 36-39 or 41-45, prohibiting the use of the associated mechanism enabling efficient radio resource adaptation to varying uplink and downlink transmission needs. Instead, the BSS would have to perform reassignments (e.g. via Packet Timeslot Reconfigure signalling) for alternating between different non FTA multislot configurations, which would consume extra signalling bandwidth and increase latency. For example, a data session involving a multislot class 45 mobile station (SUM=7) and with variable data throughput needs that can be served by a set of timeslot allocations including 1+5, 2+4, 3+3, 4+2 and 5+1 downlink+uplink timeslots (<SUM) would have to be repeatedly reconfigured between the corresponding (non FTA) multislot configurations, as none of the multislot configurations specified by the current standard would enable the whole set of desired timeslot allocations unless TA offset is used by the network.

TABLE 4

Multislot configurations for packet switched connections, from 3GPP TS 45.002 v11.0.0, Table 6.4.2.2.1

| Medium access mode | No of Slots (Note 0) | $T_{ra}$ shall apply | $T_{ta}$ shall apply | Applicable Multislot classes (see Note 7) | Note |
|---|---|---|---|---|---|
| ... | | | | | |
| Down + up, Ext. Dynamic | d + u = 7-9, u < 5 | Yes | — | 31-34, 36-39 | 2, 3, 8 |
| | d = 2-5, u = 5 | Yes | — | 34, 39 | 2, 3, 5, 8 |
| | ... | | | | |
| | d + u = 8-11, u < 6 | — | Yes | 41-45 | 2, 4, 8 |
| | d = 2-6, u = 6 | — | Yes | 45 | 2, 4, 5, 8 |
| ... | | | | | |

...
Note 3
TA offset required for multislot classes 35-39.
Note 4
TA offset required for multislot classes 40-45.
Note 5
Shifted USF operation shall apply (see 3GPP TS 44.060).
...
Note 8
These configurations can only be used for assignment to an MS supporting Flexible Timeslot Assignment (see 3GPP TS 24.008). For allocation additional restrictions apply.
...

Similar restrictions exist for non FTA multislot configurations with a total number of downlink (d) and uplink (u) slots such that d+u=SUM for the considered multislot classes. For example, for multislot classes 36-39, supporting timeslot allocations of 4 downlink slots+1 uplink slot and 3 downlink slots+2 uplink slot would be enabled by a d=4+u=2 assignment, but the corresponding multislot configuration is only valid if TA offset is used by the network ("d+u=6, d>1" multislot configurations of 3GPP TS 45.002 Table 6.4.2.2.1). Similarly, for multislot classes 41-45, supporting timeslot allocations of 5 downlink slots+1 uplink slot and 4 downlink slots+2 uplink slots would be enabled by a d=5+u=2 assignment, but the corresponding multislot configuration is only valid if TA offset is used by the network ("d+u=7, d>1" multislot configurations set of 3GPP TS 45.002 Table 6.4.2.2.1). Relevant excerpts of 3GPP 45.002, Table 6.4.2.2.1 are reproduced in Table 5 below.

TABLE 5

Multislot configurations for PS connections from 3GPP TS 45.002 v11.0.0 Table 6.4.2.2.1

| Medium access mode | No of Slots (Note 0) | $T_{ra}$ shall apply | $T_{ta}$ shall apply | Applicable Multislot classes (see Note 7) | Note |
|---|---|---|---|---|---|
| . . . | | | | | |
| Down + up, Ext. Dynamic | . . . | | | | |
| | d + u = 6, d > 1 | Yes | — | 30-45 | 2, 3 |
| | . . . | | | | |
| | d + u = 7, d > 1 | — | Yes | 40-45 | 2, 4 |
| | . . . | | | | |

. . .

Note 3
TA offset required for multislot classes 35-39.
Note 4
TA offset required for multislot classes 40-45.
. . .

In some embodiments, a new set of FTA multislot configurations applicable to high multislot class 36-39 and 41-45 mobile stations if TA offset is not used by the network are specified. Any of the FTA multislot configurations of the new set, comprising a total number of downlink (d) and uplink (u) slots such that d+u≥SUM, enables the support of a set of timeslot allocations that would require the use of TA offset otherwise.

If TA offset is not used by the network, the operation of multislot configurations with d+u=SUM timeslots necessitates the support of FTA, owing to the inability to take full advantage of the reduced switching times capability of the considered multislot classes. This involves that the FTA technique is applicable to and required for the operation of multislot configurations with d+u=SUM timeslots if TA offset is not used by the network. For the same reasons, if TA offset is not used, at most SUM−1 uplink and downlink slots in total can be used by the mobile station in a TDMA frame, of which at most SUM−2 slots can be used in the uplink and at most SUM−2 slots can be used in the downlink.

In accordance with the principles cited previously, a new set of FTA multislot configurations not requiring the use of TA offset may be specified. In some implementations, this new set may include multislot configurations 2+4, 3+3, 3+4, 4+2, 4+3, 4+4 for multislot classes 36-39 (SUM=6), and multislot configurations 2+5, 3+4, 3+5, 4+3, 4+4, 4+5, 5+2, 5+3, 5+4, 5+5 for multislot classes 41-45 (SUM=7), wherein each multislot configuration is identified as "d+u", "d" indicating the number of downlink timeslots, "u" indicating the number of uplink timeslots. In some implementations, certain FTA multislot configurations that belong to the new set applicable if TA offset is not used may correspond to non-FTA multislot configurations consisting in the same number of downlink and uplink timeslots and applicable if TA offset is used.

The FTA multislot configurations thus defined may be based on either Tra/Ttb or Tta/Trb switching times combination, both allowing for adjacent cell power measurements. For multislot classes 36-39, a given multislot configuration based on Tra/Ttb consists in a different timeslots arrangement (i.e. a different relative position of the set of uplink timeslots vs. the set of downlink timeslots in the TDMA frame) than the multislot configuration with the same number of slots based on Tta/Trb as a result of the asymmetry of the switching times achievable if TA offset is not used. It could be observed that multislot configurations based on the Tra/Ttb combination may provide support for a wider range of timeslot allocations than multislot configurations based on the Tta/Trb combination for these multislot classes. For example, a multislot configuration consisting in downlink timeslots 1 . . . 3 and uplink timeslots 2 . . . 4 based on Tta/Trb would not support the allocation of a single uplink timeslot (USF corresponding to uplink timeslot 4 cannot be monitored), and at most four timeslots in total could be used in a multislot configuration consisting in downlink timeslots 1 . . . 3 and uplink timeslots 1 . . . 3 also based on Tta/Trb, while such restrictions would not exist with a multislot configuration consisting in downlink timeslots 1 . . . 3 and uplink timeslots 1 . . . 3 based on Tra/Ttb. For multislot classes 41-45 on the other hand, multislot configurations based on Tra/Ttb and those based on Tta/Trb are similar in terms of supported timeslot allocations as the switching times achievable if TA offset is not used are symmetrical The use of shifted USF may be required for multislot configurations with u=4 uplink timeslots for multislot classes 38-39 depending on the applicable switching times combination. The use of shifted USF may be required for multislot configurations with u=5 uplink timeslots for multislot classes 44-45 regardless of the applicable switching times combination.

In some implementations, certain FTA multislot configurations that belong to the new set applicable if TA offset is not used may consist in a different assigned timeslots arrangement (i.e. a different relative position of the set of uplink timeslots vs. the set of downlink timeslots in the TDMA frame) than multislot configurations with the same number of uplink and downlink timeslots applicable if TA offset is used. This may be the case in examples where new FTA multislot configurations in the set are based on Tra/Ttb for multislot classes 36-39 or on Tta/Trb for multislot classes 41-45 or on Tra/Ttb for multislot classes 41-45. On the other hand, certain FTA multislot configurations that belong to the new set applicable if TA offset is not used may be identical to multislot configurations applicable if TA offset is used, i.e. they consist in the same number of uplink and downlink timeslots, the same assigned timeslots arrangement, and may be operated according to an identical switching times combination and an identical shifted USF applicability. In some implementations, the mobile station may determine the applicable switching times combination, whether shifted USF is applicable for a given multislot configuration or any other relevant characteristic required for operating appropriately the assigned multislot configuration from the timeslot assignment received from the network. In some implementations, it may not be necessary for the network to indicate to the mobile station whether TA offset is used or not by the network and, correspondingly, for the mobile station to receive such an indication from the network.

In some implementations, certain FTA multislot configurations that belong to the new set applicable if TA offset is not used may consist in the same assigned timeslots arrangement (i.e. the same relative position of the set of uplink timeslots vs. the set of downlink timeslots in the TDMA frame) than similar multislot configurations with the same number of uplink and downlink timeslots applicable if TA offset is used, but the similar multislot configuration is not operated according to an identical switching times combination or an identical shifted USF applicability. This may be the case for example if new FTA multislot configurations in the set are based on Tta/Trb for multislot classes 36-39. In some implementations, the mobile station may not be able to determine the applicable switching times combination, whether shifted USF is applicable for a given multislot configuration or other relevant characteristic required for operating appropriately the assigned multislot configuration from the timeslot assignment received from the network. In some implementations, the network may indicate whether TA offset is used or not, and the mobile station may use such an indication for determining the relevant characteristics required for operating appropriately the assigned multislot configuration.

In some implementations, FTA multislot configurations of the new set applicable if TA offset is not used would be such that the timeslot number in the TDMA frame of the last assigned uplink timeslot would be equal to the timeslot number in the TDMA frame of the first assigned downlink timeslot plus 2 (two) for multislot configurations based on Tra/Ttb applicable to multislot classes 36-39. FTA multislot configurations of the new set would be such that the timeslot number in the TDMA frame of the last assigned uplink timeslot would be equal to the timeslot number in the TDMA frame of the first assigned downlink timeslot plus 3 (three) for multislot configurations applicable to multislot classes 36-39 based on Tta/Trb and for multislot configurations applicable to multislot classes 41-45 based on either Tra/Ttb or Tta/Trb.

In some implementations, FTA multislot configurations of the new set applicable to multislot classes 36-39, based on Tra/Ttb and not requiring shifted USF would be such that the total number of assigned downlink and uplink timeslots is equal to six or seven ("d+u=6-7") with a number of assigned downlink timeslots between three and four ("d=3-4") and a number of assigned uplink timeslots between two and three ("u=2-3"). FTA multislot configurations of the new set applicable to multislot classes 36-39, based on Tra/Ttb and requiring shifted USF would be such that the number of assigned downlink timeslots is between two and four ("d=2-4") and the number of assigned uplink timeslots is four ("u=4"), In some implementations, FTA multislot configurations of the new set applicable to multislot classes 41-45, based on either Tra/Ttb or Tta/Trb and not requiring shifted USF would be such that the total number of assigned downlink and uplink timeslots is between seven to nine ("d+u=7-9") with a number of assigned downlink timeslots between three and five ("d=3-5") and a number of assigned uplink timeslots between two and four ("u=2-4"). FTA multislot configurations of the new set applicable to multislot classes 41-45, based on either Tra/Ttb or Tta/Trb and requiring shifted USF would be such that the number of assigned downlink timeslots is between two and five ("d=2-5") and the number of assigned uplink timeslots is five ("u=5").

Figure 6:
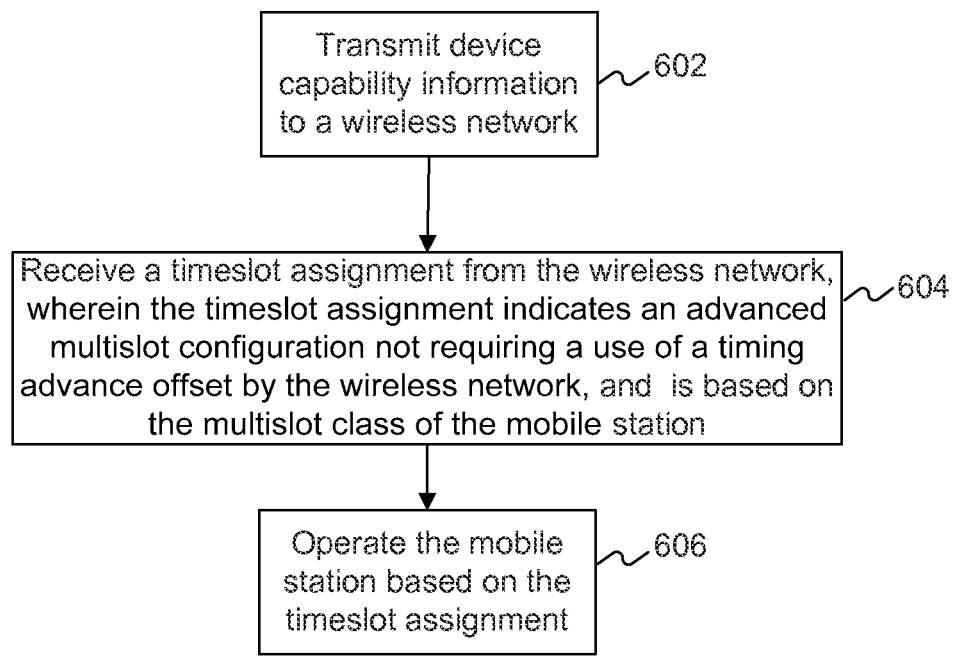
FIG. 6 is a block diagram illustrating a process of operating a mobile station supporting flexible timeslot assignment (FTA) in a wireless network.

FIG. 6 provides an exemplary embodiment of a method of operating a mobile station supporting FTA in a wireless network. The process begins at block 602 with the mobile station transmitting mobile station radio access capability information to a wireless network. The mobile station radio access capability information indicates a multislot class of the mobile station. For example, the multislot class information may indicate that the mobile station is one of multislot classes 36-39 or 41-45. In addition, the mobile station radio access capability may indicate that the mobile station supports FTA. After receiving the mobile station radio access capability information, the wireless network may determine a timeslot assignment for the mobile station based on the received capability information and on whether a timing advance offset is used or not by the wireless network. For example, if timing advance offset is not used by the wireless network and the multislot class of the mobile station is one of multislot classes 36-39, the wireless network may determine a timeslot assignment resulting in one of the following "d+u" multislot configurations ("d" denoting the number of downlink timeslots, "u" the number of uplink timeslots) that belongs to a new set of FTA multislot configurations not requiring the use of TA offset for the mobile station: 2+4, 3+3, 3+4, 4+2, 4+3, 4+4. In another example, if timing advance offset is not used by the wireless network and the multislot class of the mobile station is one of multislot classes 41-45, the wireless network may determine a timeslot assignment resulting in one of the following "d+u" multislot configurations that belongs to a new set of FTA multislot configurations not requiring the use of TA offset for the mobile station: 2+5, 3+4, 3+5, 4+3, 4+4, 4+5, 5+2, 5+3, 5+4, 5+5.

At block 604, the mobile station receives a timeslot assignment from the wireless network. The timeslot assignment is based on whether a timing advance offset is used by the wireless network and on the radio access capability of the mobile station. The mobile station may determine from the received timeslot assignment, e.g. based on the relative position of the downlink timeslots vs. the uplink timeslots in the TDMA frame, that the corresponding multislot configuration is different from a multislot configuration applicable If TA offset is used by the network, and belongs to a new set of multislot configurations applicable if TA offset is not used by the network. In this case, the mobile station may determine accordingly which switching times combination (e.g. Tra/Ttb or Tta/Trb) is applicable and whether shifted USF is used or not for the assigned multislot configuration. Alternatively, the mobile station may identify from the received timeslot assignment a multislot configuration which is identical to a multislot configuration applicable If TA offset is used by the network but is also part of a new set of multislot configurations applicable if TA offset is not used by the network. In this case, the mobile station may assume that the parameters corresponding to the multislot configuration (switching times combination, applicability of shifted USF) are applicable regardless of whether TA offset is used or not in the network. At block 606, the mobile station may operate its transmission and reception functionalities in accordance with the received timeslot assignment.

In some implementations, the requirement for using TA offset may be adapted for enabling the operation of certain FTA multislot configurations in a network not using TA offset. For example, the applicability of "Note 3" and "Note 4" in 3GPP 45.002 v11.0.0, Table 6.4.2.2.1 may be invalidated for selected multislot configurations including: for multislot classes 36-39 (SUM=6): d+u multislot configuration 4+3 within the set of multislot configurations satisfying "d+u=7-9, u<5"; for multislot classes 41-45 (SUM=7): d+u multislot configurations 4+4, 5+3, 5+4 within the set of multislot configurations satisfying "d+u=8-11, u<6". Alternatively or in combination, the requirement for using TA offset may be adapted for enabling the operation of certain non FTA multislot configurations in a network not using TA offset. For example, the applicability of "Note 3" and "Note 4" in 3GPP 45.002, Table 6.4.2.2.1 may be removed for selected multislot configurations, including: for multislot classes 36-39 (SUM=6): d+u multislot configurations 3+3, 4+2 within the set of multislot configurations satisfying "d+u=6, d>1"; for multislot classes 41-45 (SUM=7): d+u multislot configurations 3+4, 4+3, 5+2 within the set of multislot configurations satisfying "d+u=7, d>1". The operation of these selected multislot configurations not requiring the support of FTA in a network using TA offset would, in contrast, require the support of FTA in a network not using TA offset. It should be noted that the applicability of number of FTA/non FTA multislot configurations would still be limited to the case where TA offset is used, including those comprising a number of downlink slots d=SUM−1, those comprising a number of uplink slots u=SUM−1, or those for which Tra (for multislot classes 35-39) or Trb (for multislot classes 40-45) would not be satisfied if TA offset is not used.

In some implementations, a new set of FTA multislot configurations applicable when TA offset is not used, such as the one defined above, may be specified, and the network may determine a timeslot assignment for the mobile station based in part on the actual timing advance value (TA). According to an example technique, if TA≥to, the network not using TA offset may assign a multislot configuration that is only applicable if TA offset is used according to the current GERAN standard. On the other hand, if TA<to, the network may assign a FTA multislot configuration of the new set specified above. Alternatively, the network may be restricted from assigning any FTA multislot configuration for the mobile station if TA<to.

Embodiment 4

Differentiated Sets of Multislot Configurations with Extended Receive Capability (EFTA) Adapted to TA Offset Usage Multislot configurations that can only be used for assignment to a mobile station for which enhanced flexible timeslot assignment with extended receive capability is used, also referred to as multislot configurations with extended receive capability, allow the transmission on a higher number of downlink timeslots to an EFTA-capable mobile station having indicated its support of an alternative EFTA multislot class. Multislot configurations with extended receive capability are identified by a reference to "Note 12" in 3GPP TS 45.002 Table 6.4.2.2.1, in which the relevant excerpts are reproduced in Table 4 below. A mobile station of alternative EFTA multislot class 1, 2 or 3 may be assigned a multislot configuration comprising up to, respectively, 6, 7 or 8 downlink timeslots per carrier. This mobile station may monitor—and/or receive on—the extended set of downlink slots when in receive-only mode, i.e. when not transmitting in a given radio bock period. Otherwise, i.e. when in duplex mode, the mobile station operates according to its conventional—e.g. GPRS or EGPRS—multislot class, and may only be able to monitor a subset of the assigned downlink slots. The current GERAN system does not specify whether the applicability of multislot configurations with extended receive capability should depend on the use of TA offset by the network for the relevant multislot classes. Given the set of uplink timeslots assigned by the network, which subset of downlink timeslots that can be monitored by the mobile station in duplex mode may depend on the applicable switching times and on whether TA offset is used or not. For example, the total number of downlink and uplink timeslots that could be used by the mobile station if TA offset is not used would be limited to (SUM−1) timeslots instead of SUM with TA offset. In some conditions, the relative position in the TDMA frame of the subset of downlink timeslots that can be monitored by the mobile station versus the set of assigned uplink timeslots may depend in part on whether TA offset is used or not by the network.

TABLE 6

Multislot configurations for packet switched connections, from 3GPP TS 45.002 v11.0.0, Table 6.4.2.2.1

| Medium access mode | No of Slots (Note 0) | $T_{ra}$ shall apply | $T_{ta}$ shall apply | Applicable Multislot classes (see Note 7) | Note |
|---|---|---|---|---|---|
| ... | | | | | |
| Down + up, Ext. Dynamic | ... | | | | |
| | d = 6-8, u = 1-4 | Yes | — | 30-39 | 12 |
| | d = 6-8, u = 5 | Yes | — | 34, 39 | 5, 12 |
| | d = 7-8, u = 1-4 | — | Yes | 40-45 | 12 |
| | d = 7-8, u = 5-6 | — | Yes | 44-45 | 5, 12 |

...

Note 3
TA offset required for multislot classes 35-39.
Note 4
TA offset required for multislot classes 40-45.
Note 5
Shifted USF operation shall apply (see 3GPP TS 44.060).
...
Note 12
These configurations can only be used for assignment to an MS for which Enhanced Flexible Timeslot Assignment with extended receive capability is used (see Annex B.5 and 3GPP TS 44.060). Whether normal measurements (see 3GPP TS 45.008) and/or normal BSIC decoding (see 3GPP TS 45.008) are possible will be dependent of allocation.

As a consequence of this, the mobile station may select a different subset of downlink timeslots depending on which assumption is made as to whether timing advance offset is used or not by the network, while the network may send downlink data or USF for this mobile station on different timeslots. It should be observed in addition that multislot configurations with extended receive capability with 4 uplink timeslots for multislot classes 38-39 are not valid if TA offset is not used by the network, as in this case the minimum switching time (Tra=1+to) between the last uplink timeslot and the first downlink timeslot of the multislot configuration (in the next TDMA frame) would either prevent the monitoring of the first downlink timeslot and of the corresponding USF or the use of the last uplink timeslot by the mobile station. A further restriction is the lack of support for multislot configurations with Rx downlink timeslots when TA offset is not used (noting that, without TA offset, the use of the full set of Rx timeslots would only be possible in receive only mode, not in duplex mode), where Rx is the parameter associated to the applicable conventional multislot class (e.g. GPRS or EGPRS) of the mobile station (Rx=5 for multislot classes 35-39; Rx=6 for multislot classes 40-45). Multislot configurations with extended receive capability as specified by 3GPP TS 45.002 Table 6.4.2.2.1 support the assignment of a minimum of d=Rx+1 downlink slots ("d=6-8" for multislot classes 35-39, "d=7-8" for multislot classes 40-45), while other non-FTA or FTA multislot configurations supporting d=Rx downlink slots (e.g. "d+u=6, d>1", "d+u=7-9, u<5", "d=2-5, u=5" for multislot classes 35-39; "d+u=7, d>1", "d+u=8-11, u<6", "d=2-6, u=6" for multislot classes 40-45) require the use of TA offset by the network ("Note 3" and "Note 4" in 3GPP TS 45.002 V11.0.0 Table 6.4.2.2.1).

In some embodiments, two differentiated sets of multislot configurations with extended receive capability may be defined, a first set being applicable if TA offset is used, a second set being applicable if TA offset is not used. The determination at the mobile station of which set is applicable may require the knowledge of whether TA offset is used or not by the network. In some implementations, a high multislot class 35-39 or 40-45 EFTA capable mobile stations having indicated the support of an alternative EFTA multislot class may be assigned a multislot configuration belonging to one of the two sets. In some implementations, a high multislot class 35-39 or 40-45 EFTA capable mobile stations not having indicated the support of an alternative EFTA multislot class may be assigned a multislot configuration belonging to the second set.

The first set of multislot configurations, applicable if TA offset is used by the network, may include multislot configurations comprising d=6-8 downlink timeslots and u=1-5 uplink timeslots for multislot classes 35-39, and multislot configurations comprising d=7-8 downlink timeslots and u=1-6 uplink timeslots for multislot classes 40-45. If the mobile station is transmitting in a given radio block period (duplex mode), the mobile station may monitor a subset of Rx downlink timeslots (Rx=5 slots for multislot classes 35-39 and 6 slots for multislot classes 40-45), which subset of Rx timeslots is determined in part by the switching times defined as being applicable in these conditions. In some implementations, the applicable switching times may be the ones specified in 3GPP TS 45.002 Appendix B.5. In some implementations, the applicable switching times combinations may be Tra/Ttb for multislot classes 35-39, and Tta/Trb for multislot classes 40-45. In some implementations, shifted USF is applicable for multislot configurations with u=5 uplink timeslots for multislot classes 35-39, and for multislot configurations with u=5 or 6 uplink timeslots for multislot classes 40-45. In some implementations, it is not required to use shifted USF for multislot configurations comprising u=5 timeslots for multislot classes 44 and 45, which would remove the constraint of using different USF values for the first and the second assigned uplink timeslots.

The second set of multislot configurations, applicable if TA offset is not used by the network, may include multislot configurations comprising d=5-8 downlink timeslots and u=1-4 uplink timeslots for multislot classes 35-39, and multislot configurations comprising d=6-8 downlink timeslots and u=1-5 uplink timeslots for multislot classes 40-45. If the mobile station is transmitting in a given radio block period (duplex mode), the mobile station may monitor a subset of Rx−1 timeslots (Rx−1=4 slots for multislot classes 35-39 and 5 slots for multislot classes 40-45), which subset of Rx−1 timeslots is determined in part by the switching times defined as being applicable in these conditions. In some implementations, the applicable switching times may be the ones defined for the corresponding FTA multislot configurations (with the same number of uplink and downlink timeslots) not requiring TA offset specified previously in the present application. In some implementations, the applicable switching times combinations may be Tra/Ttb for multislot classes 35-39, and Tta/Trb for multislot classes 40-45. In some implementations, shifted USF is applicable for multislot configurations with u=4 uplink timeslots for multislot classes 35-39, and for multislot configurations with u=5 uplink timeslots for multislot classes 40-45. It should be noted that the multislot configurations with extended receive capability with d=Rx downlink slots applicable in case TA offset is not used could be operated by an EFTA capable mobile station not necessarily supporting an alternative EFTA multislot class.

Figure 7:
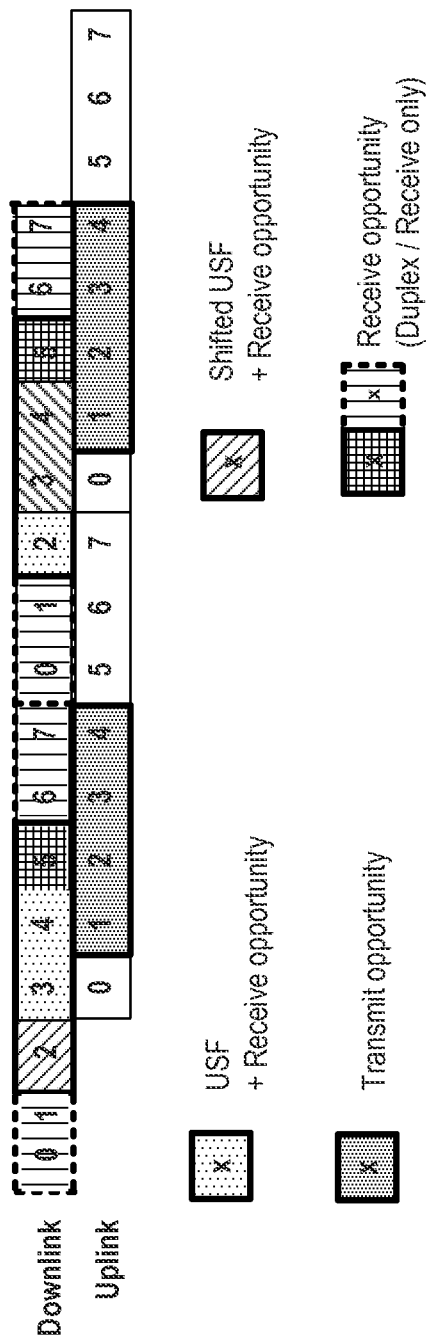
FIG. 7 is a timing diagram of a multislot configuration with extended receive capability for multislot classes 38-39 with shifted USF, applicable if TA offset is not used.

FIG. 7 illustrates a timing diagram of a multislot configuration with extended receive capability for multislot classes 38-39 with shifted USF, applicable if TA offset is not used.

To enable the differentiated operation of multislot configurations with extended receive capability based on TA offset use by the network, the mobile station may need to be aware of whether the TA offset is used or not by the network. This may be required for example for allowing the mobile station to ascertain the parameters associated with the assigned multislot configuration (e.g. switching times, applicability of shifted USF) and the appropriate subset of downlink timeslots it can monitor in duplex mode, which may not be determinable from the sole set of assigned timeslots. In some implementations, relevant information indicating whether TA offset is used or not in the cell may be set by the network and sent to the mobile station. This indication can be transmitted by adequate signalling means, e.g., through assignment (point to point) messages sent by the network to the mobile station, or through broadcast messages such as system information.

In some implementations, the mobile station may evaluate the timing advance (TA) value while camped on the serving cell. For example, if the mobile station determines TA≥to, the mobile station may assume that TA offset could be used in the cell and will consider multislot configurations of the first set, i.e. those requiring the use of TA offset by the network, as applicable in this cell until further assessment of the timing advance. If the mobile station determines TA<to, the mobile station may assume that TA offset is not used in this cell and will consider multislot configurations of the second set, i.e. those not requiring the use of TA offset, as applicable in the cell. If the mobile station determines TA≥to and the mobile station is assigned a multislot configuration comprising u=5 (multislot class 39) or u=6 (multislot class 45) uplink timeslots, or is assigned a non FTA multislot configuration or a FTA multislot configuration without extended receive capability in which the first downlink timeslot is adjacent to (multislot class 40-45 with Trb=to applicable), or separated by a single timeslot from (multislot class 35-39 with Tra=1+to applicable), the last uplink timeslot, the mobile station may assume that TA offset is used in the cell and will consider multislot configurations of the first set as applicable in this cell until the mobile station leaves the current cell. The information derived for a given cell can either be erased when the mobile station leaves the cell, or be stored and reused when the mobile station re-enters the same cell. Different policies may be specified as to when the mobile station should delete the information. For example, the mobile station may delete the derived information related to the use of TA offset in a given cell after a given period of time after leaving this cell, after a given period of time following the last assessment of the timing advance, on user demand, or when the mobile station is switched off, etc.

In some implementations whereby the mobile station does not need to be aware of whether TA offset is used or not by the network, shifted USF may be used for multislot configurations with extended receive capability with u=4 uplink timeslots for multislot classes 38 and 39. The related multislot configurations would be applicable with or without TA offset.

Figure 8A:
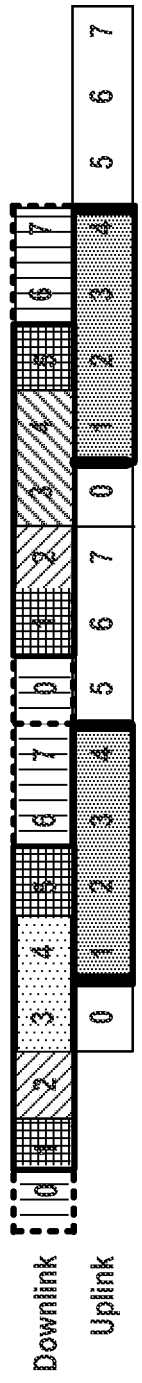
FIG. 8A is a timing diagram of a multislot configuration with extended receive capability for multislot classes 38-39 with shifted USF, applicable if TA offset is used.

FIG. 8A illustrates a timing diagram of a multislot configuration with extended receive capability for multislot classes 38-39 with shifted USF, applicable if TA offset is used.

Figure 8B:
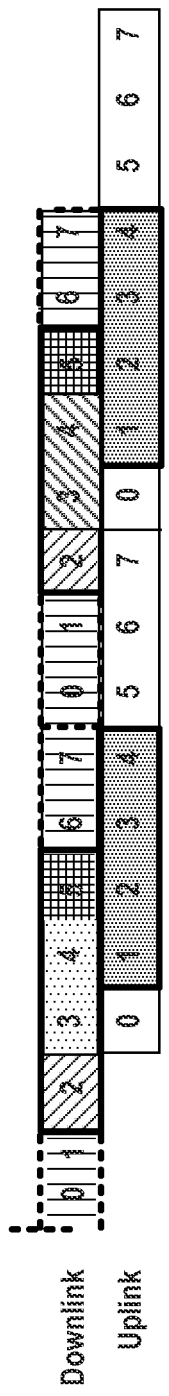
FIG. 8B is a timing diagram of a multislot configuration with extended receive capability for multislot classes 38-39 with shifted USF, applicable if TA offset is not used.

FIG. 8B illustrates a timing diagram of a multislot configuration with extended receive capability for multislot classes 38-39 with shifted USF, applicable if TA offset is not used. FIG. 8B shows that one less downlink timeslot may be monitored by the mobile station if TA offset is not used because of the observation of Tra=1+to switching time.

In some implementations whereby the mobile station may not need to be aware of whether TA offset is used or not by the network, the following multislot configurations may be specified, and defined as being applicable regardless of whether TA offset is used or not in the network: multislot configurations comprising d=6-8 downlink timeslots and u=1-4 uplink timeslots for multislot classes 35-39 (Tra/Ttb applicable, shifted USF applicable for u=4); multislot configurations comprising d=7-8 downlink timeslots and u=1-5 uplink timeslots for multislot classes 40-45 (Tta/Trb applicable, shifted USF applicable for u=5). Additionally, the following multislot configurations may be specified, and defined as being applicable only if TA offset is used by the network (a mobile station assigned such a multislot configuration may assume that TA offset is used): multislot configurations comprising d=6-8 downlink timeslots and u=5 uplink timeslots for multislot class 39 (Tra/Ttb applicable, shifted USF applicable); multislot configurations comprising d=7-8 downlink timeslots and, u=6 uplink timeslots for multislot class 45 (Tta/Trb applicable, shifted USF applicable).

In addition or alternatively, if transmitting in a given radio block period (duplex mode), the mobile station should attempt to monitor a subset of Rx downlink timeslots (Rx=5 slots for multislot classes 35-39 and 6 slots for multislot classes 40-45), which subset of Rx timeslots is determined in part by the switching times, being aware that the mobile station may not be capable of monitoring the first of these selected Rx downlink slots if TA offset is not used by the network.

Figure 9:
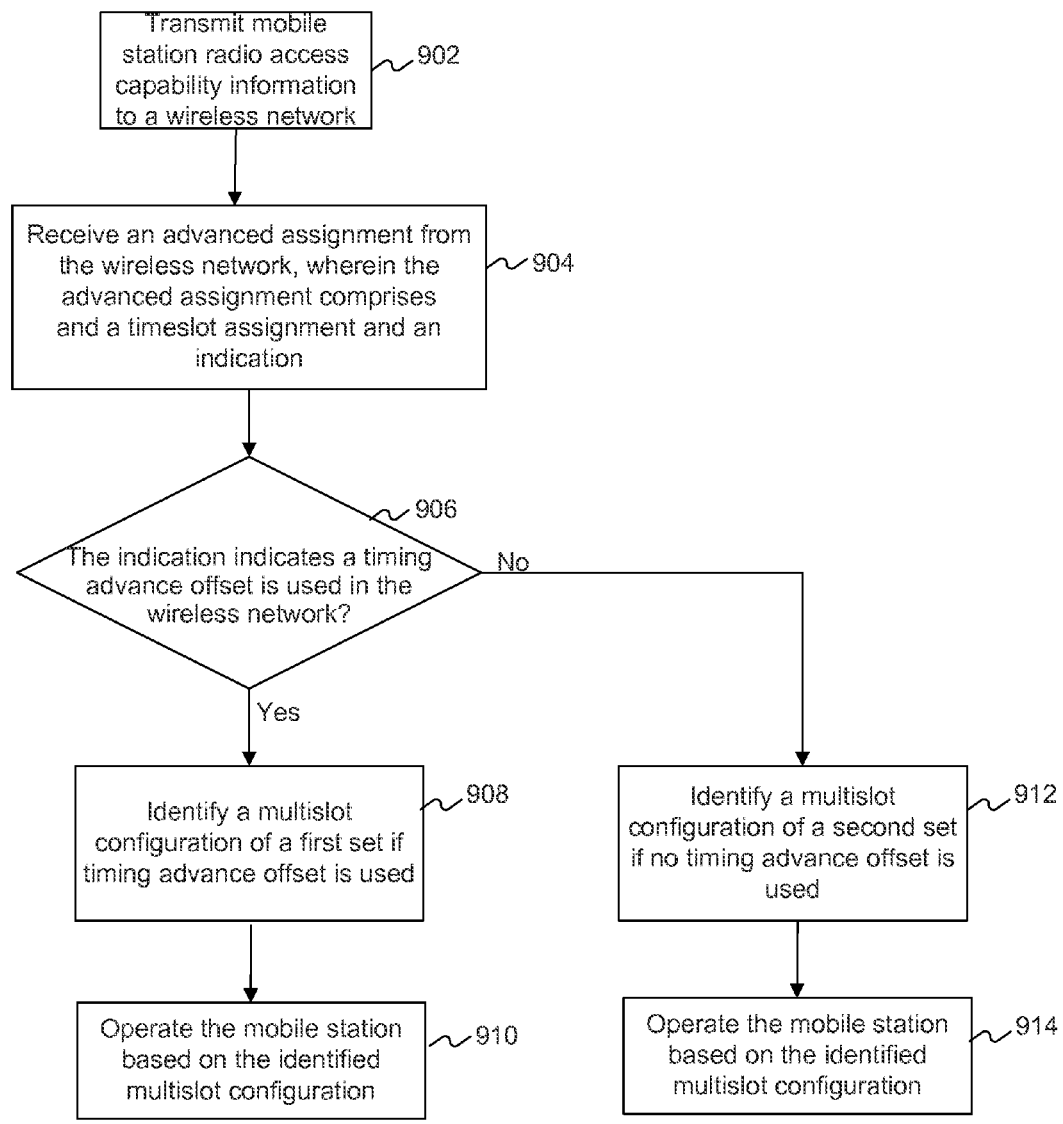
FIG. 9 is a block diagram illustrating a process of operating a mobile station supporting enhanced flexible timeslot assignment (EFTA) in a wireless network.

FIG. 9 provides an exemplary embodiment of a method of operating a mobile station supporting EFTA in a wireless network. The process begins at block 902 with the mobile station transmitting mobile station radio access capability information to a wireless network. The mobile station radio access capability information indicates a multislot class of the mobile station. For example, the multislot class information may indicate that the mobile station is one of multislot classes 35-39 or 40-45. In addition, the mobile station radio access capability indicates that the mobile station supports EFTA, and indicates an alternative EFTA multislot class. For example, the indicated alternative EFTA multislot class is the alternative EFTA multislot class 3. After receiving the mobile station radio access capability information, the wireless network may determine a timeslot assignment with extended receive capability for the mobile station, based on the received capability information and on whether a timing advance offset is used or not in the wireless network. For example, the wireless network may determine a timeslot assignment resulting in a multislot configuration that belongs to a first set if a timing advance offset is used, or in a multislot configuration that belongs to a second set if a timing advance offset is not used. At block 904, the mobile station receives a timeslot assignment and an indication from the wireless network. The indication may indicate whether a timing advance offset is used or not in the wireless network. The indication may be received in an assignment message or in a broadcast message. In some implementations, the indication may be received prior to block 902 or 904, for example, when the indication is sent in a broadcast message. At block 906, the mobile station determines whether the indication indicates that a timing advance offset is used by the wireless network. If the indication indicates that a timing advance offset is used by the wireless network, the mobile station identifies a multislot configuration applicable if timing advance offset is used at block 908. For example, if the multislot class of the mobile station is one of multislot classes 35-39, the mobile station may determine that the multislot configuration corresponding to the received timeslot assignment belongs to a first set of multislot configurations with extended receive capability applicable if TA offset is used by the network and comprising d=6-8 downlink timeslots and u=1-5 uplink timeslots. Accordingly, the mobile station may determine that shifted USF is not applicable for a multislot configuration comprising u=4 uplink timeslots but is applicable for a multislot configuration comprising u=5 uplink timeslots, that Tra/Ttb switching times combination is applicable. The mobile station may also determine which subset of Rx=5 downlink slots could be monitored when operating the multislot configuration in duplex mode. If the multislot class of the mobile station is one of multislot classes 40-45, the mobile station may determine that the multislot configuration corresponding to the received timeslot assignment belongs to a first set of multislot configurations with extended receive capability applicable if TA offset is used by the network and comprising d=7-8 downlink timeslots and u=1-6 uplink timeslots. Accordingly, the mobile station may determine that shifted USF is applicable for a multislot configuration comprising u=5 or u=6 uplink timeslots, that Tta/Trb switching times combination is applicable. The mobile station may also determine which subset of Rx=6 downlink slots could be monitored when operating the multislot configuration in duplex mode. At block 910, the mobile station may operate its transmission and reception functionalities in accordance with the identified multislot configuration.

On the other hand, if the indication indicates that a timing advance offset is not used by the wireless network at block 906, the mobile station identifies a multislot configuration applicable if no timing advance offset is used at block 912. For example, if the multislot class of the mobile station is one of multislot classes 35-39, the mobile station may determine that the multislot configuration corresponding to the received timeslot assignment belongs to a second set of multislot configurations with extended receive capability applicable if TA offset is not used by the network and comprising d=5-8 downlink timeslots and u=1-4 uplink timeslots. Accordingly, the mobile station may determine that shifted USF is applicable for a multislot configuration comprising u=4 uplink timeslots, that Tra/Ttb switching times combination is applicable. The mobile station may also determine which subset of Rx−1=4 downlink slots could be monitored when operating the multislot configuration in duplex mode. If the multislot class of the mobile station is one of multislot classes 40-45, the mobile station may determine that the multislot configuration corresponding to the received timeslot assignment belongs to a second set of multislot configurations with extended receive capability applicable if TA offset is not used by the network and comprising d=6-8 downlink timeslots and u=1-5 uplink timeslots. Accordingly, the mobile station may determine that shifted USF is applicable for a multislot configuration comprising u=5 uplink timeslots, that Tta/Trb switching times combination is applicable. The mobile station may also determine which subset of Rx−1=5 downlink slots could be monitored when operating the multislot configuration in duplex mode. At block 914, the mobile station may operate its transmission and reception functionalities in accordance with the identified multislot configuration.

Embodiment 5

Applying Tra/Ttb Instead of Tta/Trb for Multislot Classes 40-45 for Multislot Configurations with u<6 Uplink Timeslots The Tta/Trb switching times combination is applicable to a number of multislot configurations specified in 3GPP TS 45.002 Table 6.4.2.2.1, in which relevant excerpts are reproduced in Table 5 below. A mobile station assigned a multislot configuration based on Tta/Trb is required to perform adjacent cell signal level measurements between monitoring the downlink timeslots and transmitting on the uplink timeslots allocated within the TDMA frame.

TABLE 7

Multislot configurations for packet switched connections, from 3GPP TS 45.002 v11.0.0, Table 6.4.2.2.1

| Medium access mode | No of Slots (Note 0) | $T_{ra}$ shall apply | $T_{ta}$ shall apply | Applicable Multislot classes (see Note 7) | Note |
|---|---|---|---|---|---|
| Down + up, Ext. Dynamic | ... d + u = 8-11, u < 6 | — | Yes | 41-45 | 2, 4, 8 |
| | d = 2-6, u = 6 | — | Yes | 45 | 2, 4, 5, 8 |
| | ... | | | | |
| | d = 7-8, u = 1-4 | — | Yes | 40-45 | 12 |
| | d = 7-8, u = 5-6 | — | Yes | 44-45 | 5, 12 |

Note 8
These configurations can only be used for assignment to an MS supporting Flexible Timeslot Assignment (see 3GPP TS 24.008). For allocation additional restrictions apply.
Note 12
These configurations can only be used for assignment to an MS for which Enhanced Flexible Timeslot Assignment with extended receive capability is used (see Annex B.5 and 3GPP TS 44.060). Whether normal measurements (see 3GPP TS 45.008) and/or normal BSIC decoding (see 3GPP TS 45.008) are possible will be dependent of allocation.

For a non FTA/non EFTA multislot configuration, the Tta switching and measurement slots occur at a constant position within the TDMA frame, which position may only be changed when the network reassigns the radio resource to the mobile station. Therefore, when assigned a multislot configuration based on the Tta/Trb switching times combination, the mobile station schedules the measurements according to a fixed timing recurrence. However, in case FTA or EFTA (respectively) is used, the downlink/uplink timeslots allocation or usage (respectively) may change each radio block period. The Tta interval may therefore shift forward or backward, such that measurements are not scheduled with a constant timing recurrence. This scheduling variability may affect the mobile station complexity compared to the case where the measurement window is fixed. These conditions affect in particular FTA/EFTA multislot configurations assigned to multislot classes 40-45 mobile stations.

TABLE 8

Multislot configurations for packet switched connections, from 3GPP TS 45.002 v11.0.0, Table 6.4.2.2.1

| Medium access mode | No of Slots (Note 0) | $T_{ra}$ shall apply | $T_{ta}$ shall apply | Applicable Multislot classes (see Note 7) | Note |
|---|---|---|---|---|---|
| Down + up, Ext. Dynamic | ... d + u = 8-11, u < 6 | — | Yes | 41-45 | 2, 4, 8 |
| | d = 2-6, u = 6 | — | Yes | 45 | 2, 4, 5, 8 |
| | ... | | | | |
| | d = 7-8, u = 1-4 | — | Yes | 40-45 | 12 |
| | d = 7-8, u = 5-6 | — | Yes | 44-45 | 5, 12 |

Note 8
These configurations can only be used for assignment to an MS supporting Flexible Timeslot Assignment (see 3GPP TS 24.008). For allocation additional restrictions apply.
Note 12
These configurations can only be used for assignment to an MS for which Enhanced Flexible Timeslot Assignment with extended receive capability is used (see Annex B.5 and 3GPP TS 44.060). Whether normal measurements (see 3GPP TS 45.008) and/or normal BSIC decoding (see 3GPP TS 45.008) are possible will be dependent of allocation.

To address the variable time period between measurements, Tra/Ttb switching times combination may be applied instead of Tta/Trb switching times combination for multislot configurations in which the time between transmit and receive is at least one timeslot duration for multislot classes 40-45. This would allow the mobile station to schedule the adjacent cell signal level measurements according to a fixed recurrence regardless of changes in the downlink/uplink timeslots allocation (FTA) or usage (EFTA). In some implementations, the Tra/Ttb switching times combination may be made applicable for the following FTA/EFTA multislot configurations: FTA multislot configurations with the first downlink timeslot not adjacent to the last uplink timeslot, configurations with extended receive capability (EFTA) comprising a number of uplink timeslots u<6, new FTA/EFTA multislot configurations resulting from embodiments 1-4. Alternatively, the applicability of Tra/Ttb or Tta/Trb switching times combination for multislot configurations for which the time between transmit and receive is at least one timeslot duration for multislot classes 40-45 may be left as an implementation choice of the mobile station.

Embodiment 6

Network Awareness of the Capability of Supporting Enhancements Described in Embodiments 1-5

The above described embodiments 1-5 may introduce new multislot configurations or new conditions for supporting existing multislot configurations in relation to a number of existing features of the 3GPP standard. A new multislot configurations or a multislot configuration subject to additional conditions may be referred to as an advanced multislot configuration, and such multislot configurations or conditions may be indicated by an advanced assignment. These new multislot configurations or new conditions may not be natively supported by the release of the standard in which the relevant features have been introduced, e.g. Release 5 for high multislot classes, Release 7 for FTA, Release 9 for EFTA. Because of this, a network not aware of whether a given mobile station supports one or several of the enhancements resulting from embodiments 1-5 may not be able to assign and operate appropriately the considered multislot configurations.

To ensure that the network is aware of the support by the mobile station of any selected enhancement resulting from embodiments 1-5, in some implementations, a corresponding capability indication is added to the radio access capability (e.g. MS Radio Access Capability Information Element) of the mobile station either as part of the set of capabilities of the release in which the considered enhancement is introduced, or as part of the set of capabilities of a release subsequent to the release in which the considered enhancement is introduced. In some implementations, separate indications may indicate the support of different enhancements, or a single indication may indicate the combined support of multiple enhancements. For example, the mobile station may transmit an indication to the wireless network, indicating that the mobile station supports an advanced multislot configurations which does not require a use of the timing advance offset.

In some implementations, the support of one or more of the considered enhancements may be made implicit and mandatory from the earliest 3GPP standard release in which the considered enhancement(s) may be relevant, e.g. 3GPP Release 5 for embodiments 1, 2 or 5, 3GPP Release 7 for embodiment 3 (in relation to FTA), 3GPP Release 9 for embodiment 4 (in relation to EFTA) for the applicable multislot classes. In other implementations, the network may not need to be aware of the support of the considered enhancements (e.g. enhancements resulting from embodiment 5). In such cases, no additional indication is introduced. In some implementations, the support of one or more of the considered enhancements may be made mandatory for the mobile station from a given release onwards. In this case, such support can be signalled using an indicator reflecting that the mobile station supports the mandatory features specified for the considered release (e.g. a GERAN feature package N indicator, N≥3) or could be reflected by existing capability(ies) related to other features specified for the considered release. In some implementations, reserved codepoints or unused field values of the MS Radio Access capability Information Element (e.g. values 0, 30, 31 of the Dual Transfer Mode (DTM) GPRS/EGPRS multislot class fields, that may be combined with the High Multislot Capability 2 bit field) may be used for indicating the support of selected enhancements.

The methods above may be performed by accessing a non-transitory computer readable medium having computer-readable instructions stored thereon for execution on a network device.

The systems and methods described above may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via network 20. Such a computer-readable memory and a computer data signal are also within the scope of the present disclosure, as well as the hardware, software and the combination thereof.

The example processes of FIGS. 6 and 9 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of 6 and 9 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, in the context of the current invention disclosure, as used herein, the terms "computer readable" and "machine readable" are considered technically equivalent unless indicated otherwise.

While several implementations have been provided in the present disclosure, it should be understood that the disclosed systems and methods may be implemented in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure.

What is claimed is:

1. A method of a mobile station, comprising:
transmitting device capability information to a wireless network, the device capability information indicating a multi slot class of the mobile station characterized by a switching time based on a timing advance offset;
transmitting an indication to the wireless network, the indication indicating that the mobile station supports flexible timeslot assignment (FTA) multislot configurations which do not require a use of a timing advance offset;
receiving from the wireless network an assignment of an FTA multislot configuration from a set of multislot configurations, wherein each multislot configuration in the set comprises a total number of assigned downlink and uplink timeslots greater than or equal to a Sum multislot capability parameter and does not require the use of a timing advance offset by the wireless network; and
operating the mobile station in the FTA multislot configuration assigned by the wireless network.

2. The method of claim 1, wherein the multislot class of the mobile station is one of multislot classes 36-39, and a switching time allowing the mobile station to perform cell measurements before the mobile station gets ready to receive is used in determining the FTA multislot configuration.

3. The method of claim 2, wherein the FTA multislot configuration is included in the set of the following multislot configurations:
two contiguous downlink timeslots and four contiguous uplink timeslots in a Time Division Multiple Access (TDMA) frame;
three contiguous downlink timeslots and three contiguous uplink timeslots in the TDMA frame;
three contiguous downlink timeslots and four contiguous uplink timeslots in the TDMA frame;
four contiguous downlink timeslots and two contiguous uplink timeslots in the TDMA frame;
four contiguous downlink timeslots and three contiguous uplink timeslots in the TDMA frame; and four contiguous downlink timeslots and four contiguous uplink timeslots in the TDMA frame;

the multislot configurations satisfy a condition of: last_uplink_timeslot_number=first_downlink_timeslot_number+2, wherein the first_downlink_timeslot_number is a timeslot number in the TDMA frame of a first assigned downlink timeslot, and the last_uplink_timeslot_number is a timeslot number in the TDMA frame of a last assigned uplink timeslot.

4. The method of claim 3, wherein a shifted uplink state flag (USF) is used for a multislot configuration comprising four uplink timeslots.

5. The method of claim 3, wherein the FTA multislot configuration satisfies one of the following conditions:
   a shifted USF is not used and the multislot configuration is such that d+u=6 or 7, d=3 or 4, and u=2 or 3; and
   a shifted USF is used and the multislot configuration is such that d=2, 3, or 4, u=4;
   wherein d is a number of downlink timeslots, u is a number of uplink timeslots.

6. The method of claim 1, wherein the multislot class of the mobile station is one of multislot classes 41-45, and at least one of a first switching time and a second switching time is used in determining the FTA multislot configuration, wherein the first switching time is a switching time allowing the mobile station to perform cell measurements before the mobile station gets ready to transmit, and the second switching time is a switching time allowing the mobile station to perform cell measurements before the mobile station gets ready to receive.

7. The method of claim 6, wherein the FTA multislot configuration is included in the set of the following multislot configurations:
   two contiguous downlink timeslots and five contiguous uplink timeslots in a Time Division Multiple Access (TDMA) frame;
   three contiguous downlink timeslots and four contiguous uplink timeslots in the TDMA frame;
   three contiguous downlink timeslots and five contiguous uplink timeslots in the TDMA frame;
   four contiguous downlink timeslots and three contiguous uplink timeslots in the TDMA frame;
   four contiguous downlink timeslots and four contiguous uplink timeslots in the TDMA frame;
   four contiguous downlink timeslots and five contiguous uplink timeslots in the TDMA frame;
   five contiguous downlink timeslots and two contiguous uplink timeslots in the TDMA frame;
   five contiguous downlink timeslots and three contiguous uplink timeslots in the TDMA frame;
   five contiguous downlink timeslots and four contiguous uplink timeslots in the TDMA frame; and
   five contiguous downlink timeslots and five contiguous uplink timeslots in the TDMA frame;
   the multislot configurations satisfy a condition of: last_uplink_timeslot_number=first_downlink_timeslot_number+3, wherein the first_downlink_timeslot_number is a timeslot number in the TDMA frame of a first assigned downlink timeslot, and the last_uplink_timeslot_number is a timeslot number in the TDMA frame of a last assigned uplink timeslot.

8. The method of claim 7, wherein a shifted uplink state flag (USF) is used for a multislot configuration comprising five uplink timeslots.

9. The method of claim 7, wherein the FTA multislot configuration satisfies one of the following requirements:
   a shifted USF is not used and the multislot configuration is such that d+u=7, 8, or 9, d=3, 4, or 5, u=2, 3, or 4; and
   a shifted USF is used and the multislot configuration is such that d=2, 3, 4, or 5, u=5;
   wherein d is a number of downlink timeslots, u is a number of uplink timeslots.

10. The method of claim 1, wherein:
    the multislot class of the mobile station is one of multislot classes 38 and 39;
    the FTA multislot configuration comprises one downlink timeslot and four uplink timeslots;
    a switching time allowing the mobile station to perform cell measurements before the mobile station gets ready to receive is used for the FTA multislot configuration; and
    a shifted uplink state flag (USF) is used by the mobile station.

11. The method of claim 1, wherein the Sum multislot capability parameter is a total number of uplink and downlink timeslots that can be used by the mobile station in a TDMA frame.

12. A method of a mobile station, comprising:
    transmitting device capability information to a wireless network, the device capability information indicating a multislot class of the mobile station characterized by a switching time based on a timing advance offset;
    transmitting a first indication to the wireless network, the indication indicating that the mobile station supports an advanced assignment;
    receiving an advanced assignment from the wireless network, wherein the advanced assignment comprises a second indication indicating whether a timing advance offset is used by the wireless network;
    identifying, in response to the advanced assignment, a multislot configuration selected from two sets of multislot configurations, based on the second indication and the multislot class of the mobile station, the first set being applicable if the timing advance offset is used by the wireless network, the second set being applicable if the timing advance offset is not used by the wireless network; and
    operating the mobile station in the multislot configuration.

13. The method of claim 12, wherein the mobile station supports enhanced flexible timeslot assignment (EFTA).

14. The method of claim 12, wherein the device capability information indicates support of an alternative EFTA multislot class, and enhanced flexible timeslot assignment with extended receive capability is used to operate the multislot configuration.

15. The method of claim 14, wherein:
    the second indication indicates that a timing advance offset is used by the wireless network;
    the multislot class of the mobile station is one of multislot classes 35-39; and
    the multislot configuration consists in six to eight contiguous downlink timeslots, and one to five contiguous uplink timeslots, in a Time Division Multiple Access (TDMA) frame.

16. The method of claim 14, wherein:
    the second indication indicates that a timing advance offset is used by the wireless network;
    the multislot class of the mobile station is one of multislot classes 40-45; and the multislot configuration consists in seven to eight contiguous downlink timeslots, and one to six contiguous uplink timeslots, in a Time Division Multiple Access (TDMA) frame.

17. The method of claim 14, wherein:

the second indication indicates that a timing advance offset is not used by the wireless network;

the multislot class of the mobile station is one of multislot classes 35-39;

the multislot configuration consists in five to eight contiguous downlink timeslots, and one to four contiguous uplink timeslots, in a Time Division Multiple Access (TDMA) frame;

a shifted uplink state flag (USF) is used for a multislot configuration comprising four uplink timeslots; and a switching time allowing the mobile station to perform cell measurements when the mobile station operates in duplex mode in a Time Division Multiple Access (TDMA) frame is used for the multislot configuration.

18. The method of claim 14, wherein:

the second indication indicates that a timing advance offset is not used by the wireless network;

the multislot class of the mobile station is one of multislot classes 40-45;

the multislot configuration consists in six to eight contiguous downlink timeslots, and one to five contiguous uplink timeslots, in a Time Division Multiple Access (TDMA) frame;

a shifted uplink state flag (USF) is used for a multislot configuration comprising five uplink timeslots; and a switching time allowing the mobile station to perform cell measurements when the mobile station operates in duplex mode in a Time Division Multiple Access (TDMA) frame is used for the multislot configuration.

19. The method of claim 12, wherein:

the device capability information does not indicate support of an alternative EFTA multislot class;

the second indication indicates that a timing advance offset is not used by the wireless network;

the number of downlink timeslots of the multislot configuration is equal to a maximum number of receive timeslots the mobile station can use in a TDMA timeframe; and enhanced flexible timeslot assignment with extended receive capability is used to operate the multislot configuration.

20. The method of claim 12, wherein the multislot class of the mobile station is one of multislot classes 40-45, and a switching time allowing the mobile station to perform cell measurements when the mobile station operates in duplex mode in a Time Division Multiple Access frame is used for the multislot configuration.

21. The method of claim 12, wherein the second indication is received in an assignment message or in a broadcast message.

* * * * *

UNITED STATES PATENT AND TRADEMARK OFFICE
CERTIFICATE OF CORRECTION

PATENT NO. : 9,628,171 B2
APPLICATION NO. : 13/840270
DATED : April 18, 2017
INVENTOR(S) : Rene Faurie Page 1 of 1

It is certified that error appears in the above-identified patent and that said Letters Patent is hereby corrected as shown below:

On the Title Page

Column 1 (Applicant) Line 1: Delete "Limited" and insert -- Limited, Waterloo, (CA) --, therefor.

In the Claims

Column 26, Line 31: In Claim 1, delete "multi slot" and insert -- multislot --, therefor.

Signed and Sealed this
Twenty-second Day of August, 2017

Joseph Matal
*Performing the Functions and Duties of the
Under Secretary of Commerce for Intellectual Property and
Director of the United States Patent and Trademark Office*